United States Patent

Takeda

Patent Number: 5,485,282
Date of Patent: Jan. 16, 1996

[54] COMMUNICATION PROCESSING APPARATUS

[75] Inventor: Takashi Takeda, Higashimurayama, Japan

[73] Assignee: Canon Kabuishiki Kaisha, Tokyo, Japan

[21] Appl. No.: 83,786

[22] Filed: Jun. 28, 1993

Related U.S. Application Data

[63] Continuation of Ser. No. 823,055, Jan. 17, 1992, abandoned, which is a continuation of Ser. No. 419,775, Oct. 11, 1989, abandoned.

[30] Foreign Application Priority Data

Oct. 13, 1988 [JP] Japan ................... 63-255936

[51] Int. Cl.⁶ ................ H04N 1/00; H04N 1/40
[52] U.S. Cl. ............ 358/435; 358/434; 358/449
[58] Field of Search ................ 358/434, 435, 358/436, 438, 439, 449, 451, 400

[56] References Cited

U.S. PATENT DOCUMENTS

| | | | |
|---|---|---|---|
| 4,353,097 | 10/1982 | Takeda et al. | 358/287 |
| 4,423,439 | 12/1983 | Watanabe | 358/451 |
| 4,506,302 | 3/1985 | Kurata | 358/449 |
| 4,511,904 | 4/1985 | Takahashi | 346/134 |
| 4,631,596 | 12/1986 | Yaguchi | 358/449 |
| 4,679,093 | 7/1987 | Yaguchi | 358/438 |
| 4,712,139 | 12/1987 | Kato | 358/439 |
| 4,717,967 | 1/1988 | Yoshida | 358/296 |
| 4,772,955 | 9/1988 | Kurahayashi et al. | 358/426 |
| 4,789,900 | 12/1988 | Takahashi | 358/439 |
| 4,814,894 | 3/1989 | Yoshida | 358/449 |
| 4,845,569 | 7/1989 | Kurahayashi et al. | 358/400 |
| 4,855,839 | 8/1989 | Saito | 358/449 |
| 4,922,350 | 5/1990 | Rombola et al. | 359/449 |

*Primary Examiner*—Edward L. Coles, Sr.
*Assistant Examiner*—Thomas D. Lee
*Attorney, Agent, or Firm*—Fitzpatrick, Cella, Harper & Scinto

[57] ABSTRACT

The paper size of a document to be transmitted is discriminated, the attributes of the transmitted image are negotiated with a terminal on the receiving side based on the discriminated paper size, and the image data of the document are transmitted to the terminal on the receiving side based on the attributes negotiated.

28 Claims, 8 Drawing Sheets

| PAPER SIZE / DOCUMENT TYPE | MEIN SCANNING (BMU) | AUXILIARY SCANNING (BMU) |
|---|---|---|
| NORTH AMERICAN (LETTER) | 10200 | 13200 |
| ISO B4 | 11811 | 16677 |
| ISO A3 | 14030 | 19840 |
| JAPANESE LEGAL (JIS B4) | 12141 | 17196 |
| JAPANESE LETTER (JIS B5) | 8598 | 12141 |
| LEGAL | 10200 | 16800 |
| LEISURE | 13200 | 20400 |

| DOCUMENT NO. | DOCUMENT TYPE | PAPER SIZE | |
|---|---|---|---|
| | | MAIN SCANNING (BMU) | AUXILIARY SCANNING (BMU) |
| 1 | NORTH AMERICAN (LETTER) | 10200 | 13200 |
| 2 | ISO B4 | 11811 | 16677 |
| 3 | ISO A3 | 14030 | 19840 |
| 4 | JAPANESE LEGAL (JIS B4) | 12141 | 17196 |
| 5 | JAPANESE LETTER (JIS B5) | 8598 | 12141 |
| 6 | LEGAL | 10200 | 16800 |
| 7 | LEISURE | 13200 | 20400 |

COMMUNICATION PROCESSING APPARATUS

This application is a continuation of application Ser. No. 07/823,055 filed Jan. 17, 1992, now abandoned which application is a continuation of application Ser. No. 07/419,775 filed Oct. 11, 1989, now abandoned.

BACKGROUND OF THE INVENTION

This invention relates to a communication processing apparatus, for example, a communication processing apparatus having the function of a class 1, group 4 (hereinafter referred to as "G4") facsimile machine in accordance with the recommendation of the CCITT (the International Telegraph and Telephone Consultative Committee).

Apparatus of this type are capable of transmitting documents of respective sizes in accordance with Table 3/T.563 of CCITT advisory T.563 and Table 1/T.503 of CCITT advisory T.503.

However, since the tables of the CCITT advisories do not include legal and leisure paper sizes as used in North America, for example, it is impossible to send and receive these paper sizes with the prior-art apparatus described above.

When sending and receiving information using legal-size paper, a method is used in which the document is declared to be a letter (North American). However, this is disadvantageous in that information in an amount equivalent to the difference (in the feed scanning direction) between the legal and letter paper sizes is lost.

SUMMARY OF THE INVENTION

An object of the present invention is to eliminate the foregoing drawbacks encountered in the prior art.

Another object of the present invention is to provide a communication processing apparatus capable of reliably transmitting information without loss or omission even when transmitting documents having paper sizes other those stipulated by the CCITT.

Yet another object of the present invention is to provide a communication processing apparatus with which it is possible to set any transmission image size between terminals on the sending and receiving sides.

Still another object of the present invention is to provide a communication processing apparatus which performs a negotiation prior to a transmission using tables of transmittable paper sizes, which include paper sizes other than those stipulated by the CCITT, provided respectively on the sending- and receiving-side terminals.

Yet another object of the present invention is to provide a communication processing apparatus in which the terminal on the receiving side will select a document size the same or nearly the same as a transmitted document when the document size is transmitted at the time of a transmission from the terminal on the sending side to the terminal on the receiving side.

A further object of the present invention is to provide a communication processing apparatus comprising discriminating means for discriminating the paper size of a transmission document, negotiating means for negotiating attributes of a transmission image with a terminal of a receiving party based on the discriminated paper size, and transmitting means for transmitting image data of the transmission document to the terminal of the receiving party based on the negotiated attributes.

A further object of the present invention is to provide a communication processing apparatus comprising discriminating means for discriminating the paper size of a transmission document, identifying means for identifying the type of document based on the discriminated paper size, negotiating means for negotiating attributes of a transmission image with a terminal of a receiving party based on the identified document type, and transmitting means for transmitting image data of the transmission document to the terminal of the receiving party based on the negotiated attributes.

A further object of the present invention is to provide a communication processing apparatus comprising discriminating means for discriminating the paper size of a transmission document, verifying means for verifying a function of a terminal of a receiving party based on the discriminated paper size, deciding means for deciding paper size at time of transmission based on the verified terminal function, negotiating means for negotiating attributes of a transmission image with the terminal of the receiving party based on the decided paper size, and transmitting means for transmitting image data of the transmission document to the terminal of the receiving party based on the negotiated attributes.

A further object of the present invention is to provide a communication processing apparatus comprising discriminating means for discriminating the paper size of a transmission document, identifying means for identifying the type of document based on the discriminated paper size, verifying means for verifying a function of a terminal of a receiving party based on the identified document type, deciding means for deciding document type at time of transmission based on the verified terminal function, negotiating means for negotiating attributes of a transmission image with the terminal of the receiving party based on the decided document type, and transmitting means for transmitting image data of the transmission document to the terminal of the receiving party based on the negotiated attributes.

Other objects of the present invention will become clear from the description and claims based on the accompanying drawings.

BRIEF DESCRIPTION OF THE DRAWINGS

FIG. 2 illustrates a table showing the correspondence between document type and paper size;

FIG. 5 illustrates a table showing the correspondence between document type and paper size according to a second embodiment of the invention;

DESCRIPTION OF THE PREFERRED EMBODIMENTS

Preferred embodiments of the present invention will now be described in detail with reference to the accompanying drawings.

(FIRST EMBODIMENT)

Figure 1:
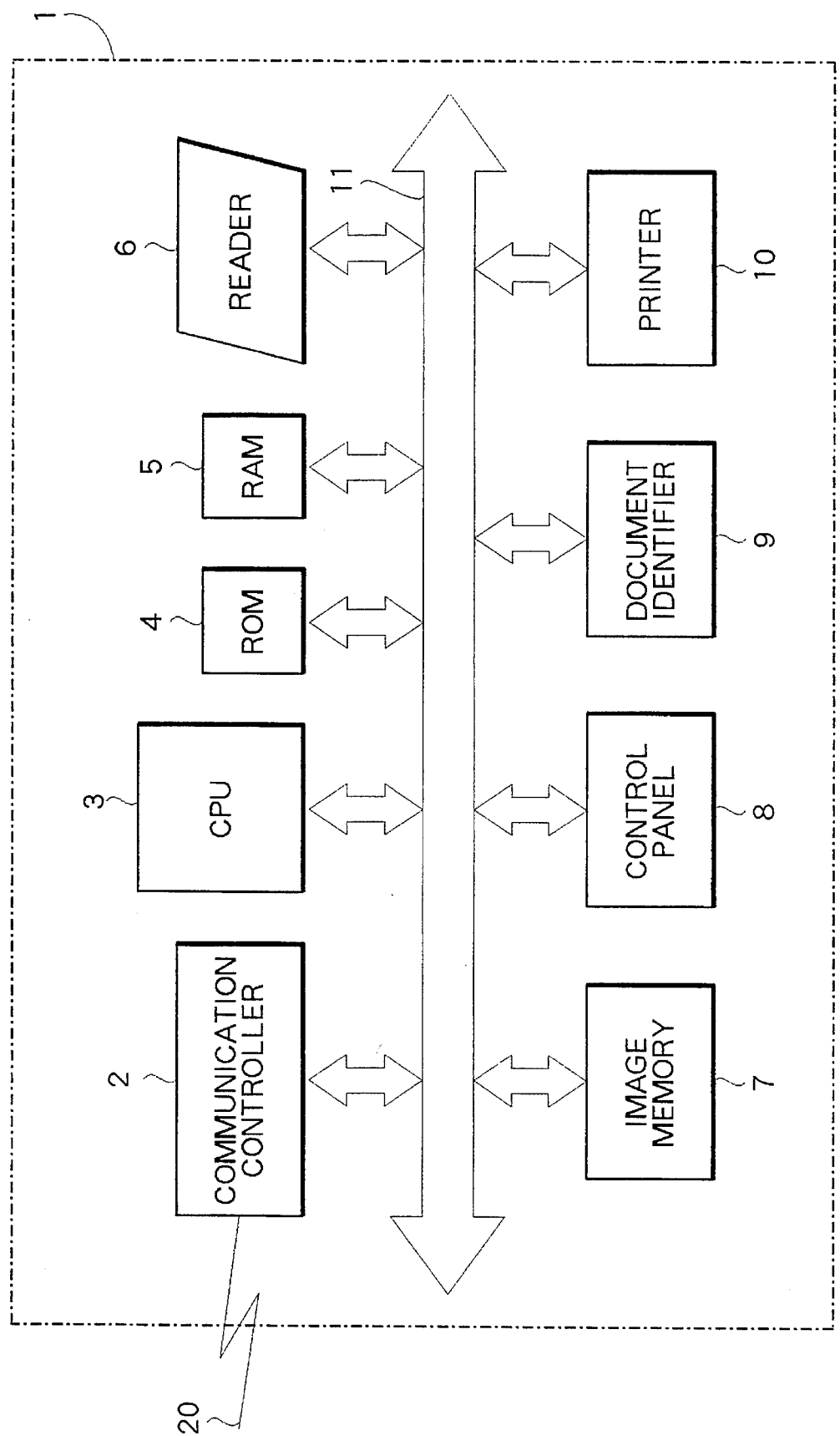
FIG. 1 is a block diagram illustrating the construction of a first embodiment of a communication processing apparatus.

FIG. 1 is a block diagram illustrating the construction of a first embodiment of a communication processing apparatus according to the present invention. Numeral 1 in FIG. 1 denotes a facsimile apparatus of G4, Class 1 type according to the embodiment. The facsimile apparatus 1 includes a transmission controller 2 for controlling data transmission with an external terminal (facsimile apparatus) via a communication line 20, a CPU 3 for overall control of the apparatus 1, a ROM 4 storing a control program which operates the CPU 3, an error processing program, and a program for operating the CPU 3 in accordance with the flowchart of FIG. 3, described below, and a RAM 5 used as a working area for running the various programs in the ROM 4 and as a temporary saving area at the time of error processing. The ROM 4 also stores a document size table 100, described below.

The facsimile apparatus 1 further includes a reader 6 for optically reading a document image, an image memory 7 for storing the image data of a transmitted document read by the reader 6, a control panel 8 equipped with various keys for designating such operations as a transmission procedure, and a document identification unit 9 for detecting, based on the image data stored in the image memory 7, the paper size of a document read by the reader 6, and for identifying the type of document. Also provided are a printer 10 for printing an image on recording paper based on image data received from the terminal of another party, and a bus line 11 for transmitting address signals, data and control signals within the apparatus 1.

FIG. 2 is a view showing a table illustrating the correspondence between document type and paper size according to the first embodiment. In FIG. 2, a document size table 100 is a table in which document type and the corresponding paper size are tabulated. According to the present invention, paper size is expressed in BMU's (basic measurement units). In this case, the relationship which holds is 1 (BMU)= 1/1200 (inch).

By way of example, if the type of document is North American (letter), then the paper size will be 10200 BMU in the main scanning direction and 13200 BMU in the feed or auxiliary scanning direction in accordance with the table 100 shown in FIG. 2. In case of legal-size paper, paper size will be 10200 BMU in the main scanning direction and 16800 BMU in the auxiliary scanning direction. For leisure-size paper, paper size will be 13200 BMU in the main scanning direction and 13200 BMU in the auxiliary scanning direction.

A method of transmitting the image of a transmission document according to the first embodiment will now be described.

Figure 3:
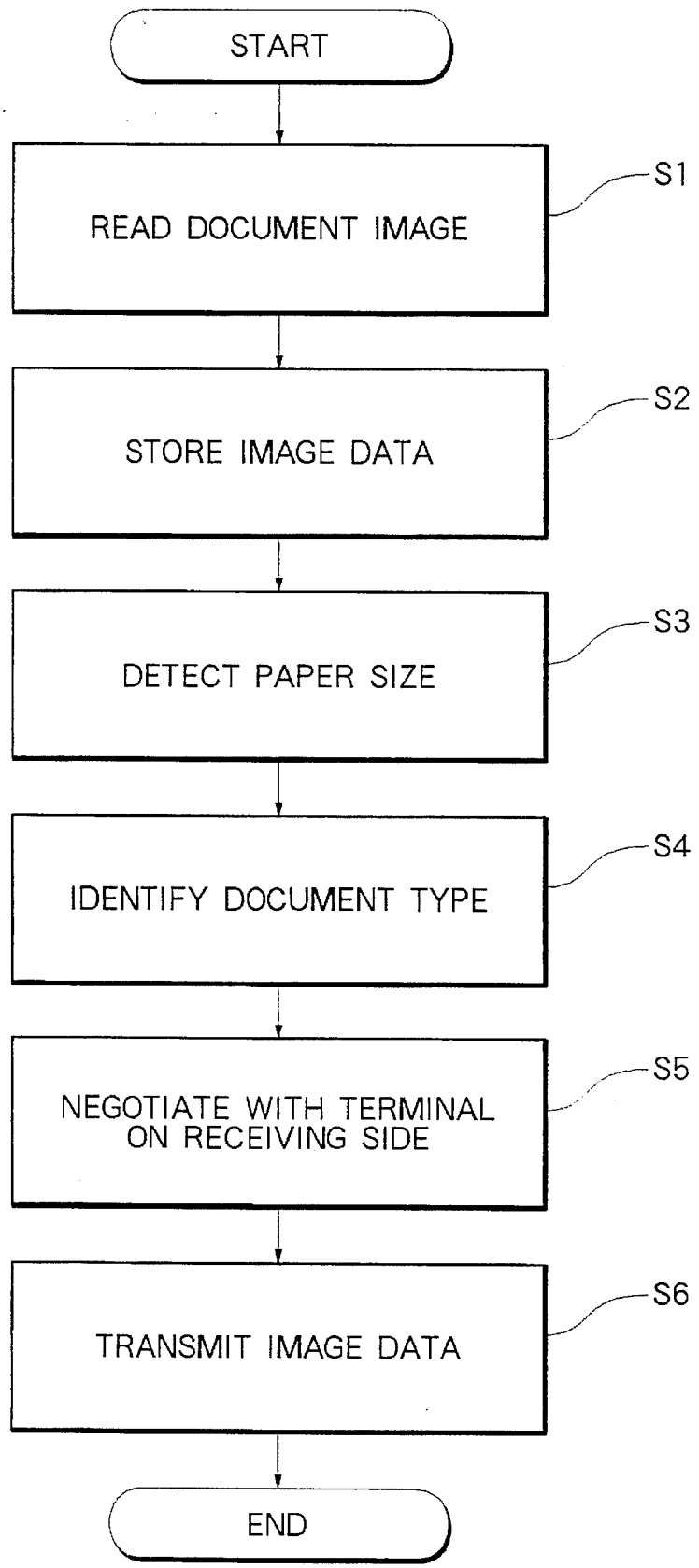
FIG. 3 is a flowchart for describing the operation of image transmission according to the first embodiment of the invention.

FIG. 3 is a flowchart for describing the operation of image transmission according to the first embodiment of the invention.

First, one page of a document image is read by the reader 6 (step S1), and the read image is stored in the image memory 7 in an image data format (step S2). Next, the paper size of one page is detected from the image data in image memory 7 by the document identifying unit 9 (step S3), and the type of document corresponding to the detected paper size is identified by the document size table 100 (step S4). Based on the type of document identified, a negotiation is performed with the terminal on the receiving side to negotiate the attributes of the transmitted image (step S5). Thereafter, the image data is transmitted based on the negotiated attributes and processing is terminated (step S6).

The processing of steps S5 and S6 will now be described in further detail.

Figure 4:
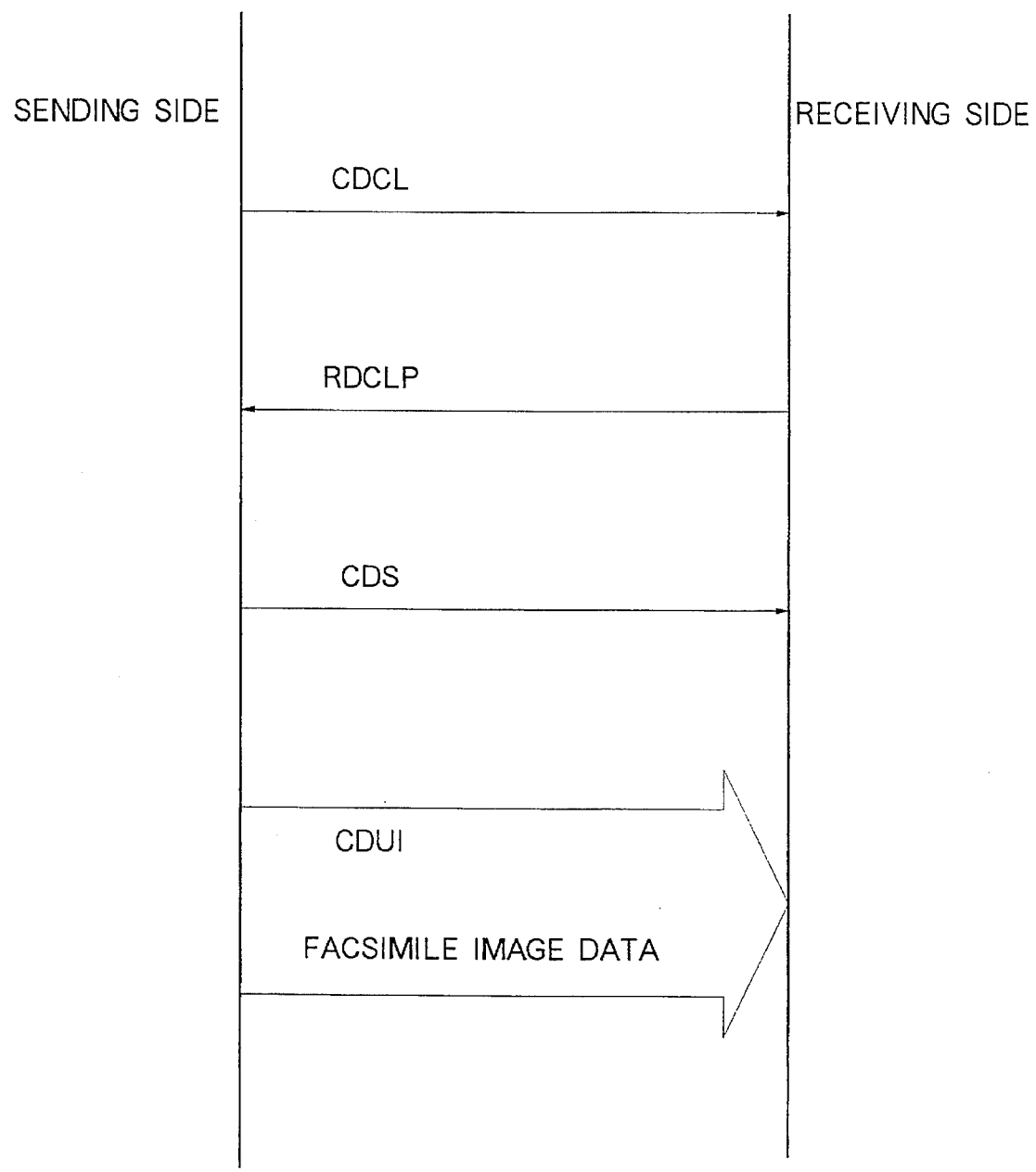
FIG. 4 is a view for describing negotiation between a sending terminal and a receiving terminal according to the first embodiment.

FIG. 4 is a view for describing negotiation between a sending terminal and a receiving terminal according to the first embodiment.

In accordance with the communication protocol shown in FIG. 4, the terminal (facsimile apparatus 1) on the sending side executes processing in which the paper size and resolution of the document about to be sent are communicated to the terminal on the receiving side by a CDCL (command document capability list). Here the type of document is communicated to the terminal of the other party based on the paper size of the document. Next, the document size and resolution capable of being received on the receiving-side terminal are communicated to the sending side (the facsimile apparatus 1) by RDCLP (response document command list positive). Here the type of document capable of being received on the receiving side is communicated to the apparatus 1 on the sending side as a response. The terminal (facsimile apparatus 1) on the sending side judges the contents of the CDCL and RDCLP and sets the paper size and resolution of the document receivable at the terminal on the receiving side. The information indicative of the set paper size and resolution is communicated, by CDS (command data start), to the terminal on the receiving side as the attributes of the image data (a written manuscript or the like) which will prevail when a transmission is performed by subsequent processing. That is, CDS is a sign that transmission at the attributes (paper size and resolution) negotiated between both terminals will now start with respect to the destination of the transmission. Thus, the paper size and resolution of the transmitted document is set page by page at the terminal (apparatus 1) on the sending side, and the facsimile image data is transmitted to the terminal on the receiving side by CDUI (command document user information).

An example of negotiation will now be given for a case where the paper size used is that of legal-size paper. In accordance with the communication protocol shown in FIG. 4, first CDCL (10200, 16800) is transmitted from the terminal on the sending side to the terminal on the receiving side, then RDCLP (10200, 16800) is transmitted from the terminal on the receiving side to the terminal on the sending side. CDS (10200, 16800) is then transmitted from the terminal on the sending side to the terminal on the receiving side, followed by CDUI (10200, 16800). The negotiation between the terminals on the sending and receiving sides is thus concluded. By means of the processing described above, even paper sizes other than those stipulated by the CCITT can be transmitted.

It should be noted that the foregoing is premised on the fact that the terminal on the receiving side is also provided with a table similar to that of the document size table 100 in apparatus 1. This will make it possible to set the paper size in the RDCLP at the time of negotiation so that paper sizes other than those stipulated can be sent and received.

Thus, in accordance with the embodiment described above, all information on a document can be transmitted reliably without omission even with document paper sizes other than those stipulated by the CCITT.

(SECOND EMBODIMENT)

In the first embodiment described above, paper size is used as one of the attributes at the time of negotiation. However, the invention is not limited to such embodiment, for it is permissible to adopt the type of document (paper) per se, corresponding to paper size in the table 100 of FIG. 2, as identifying information and use this as an attribute. A second embodiment exemplifying this will now be described.

FIG. 5 is a view showing a table illustrating the correspondence between document type and paper size according to a second embodiment. In FIG. 5, a document size table 200 is a table storing document types and paper sizes in corresponding form, just as in table 100 described earlier. Table 200 also includes document numbers corresponding to the various types of documents.

As for the image transmission operation according to the second embodiment, the paper size of a transmitted document is detected using the table 200, and the document number corresponding to this paper size is read. The document number is treated just as the paper size in the first embodiment and functions as a parameter between the two terminals. The overall operation is similar to that of the first embodiment and need not be described again. Processing performed by the terminal on the receiving side additionally includes processing for identifying the paper size from the document number received.

Thus, since using a document number as an attribute is sufficient for allowing the terminal on the receiving side to identify the paper size, the amount of information involved in negotiation can be reduced. It goes without saying that the actions and effects that can be obtained are similar to those of the first embodiment.

(THIRD EMBODIMENT)

In the first and second embodiments a case is described in which negotiation is possible between terminals on the sending and receiving sides even when there are not stipulations by the CCITT. However, there are instances where the above-described negotiation is impossible, as when the terminal belonging to another party does not possess the table 100.

In this connection, a third embodiment of the invention will be described. Since the construction of the third embodiment is similar to that of the first embodiment, a description thereof will be deleted.

In a case where communication between terminals on sending and receiving sides is not feasible because provisions for this are not made by the CCITT, the possibility arises that operation at the terminal on the receiving side may not be implemented when a control signal such as the CDCL indicative of a paper size other than that stipulated is received. When such is the case, it will suffice to employ a non-standard terminal function contained in CCITT advisory T.62 or a parameter used therein and negotiate, between the terminals, an operation other than that stipulated. Such a method will now be described.

Figure 7:
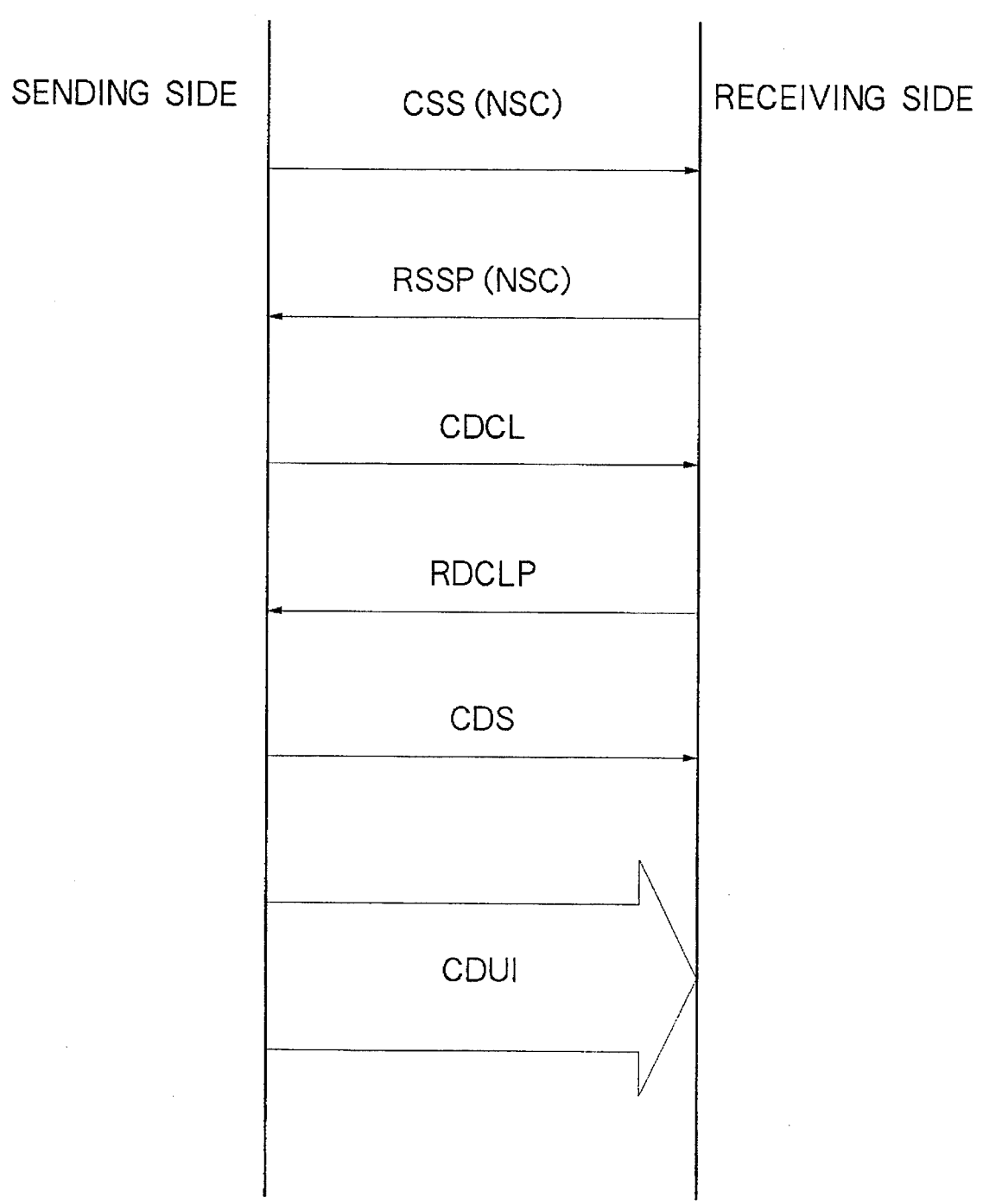
FIG. 7 is a view for describing negotiation between a sending terminal and a receiving terminal according to the third embodiment.

FIG. 7 is a view for describing negotiation between a sending terminal and a receiving terminal according to the third embodiment. In FIG. 7, CSS (command session start) indicates a command for transmitting a general transmission request from the terminal on the sending side to the terminal on the receiving side, and RSSP (response session start positive) indicates a command which is a positive response to the CSS command. NSC (non-standard capability) contained in the CSS and RSS indicates a command for transmitting a non-standard terminal function. In the negotiation based on CSS and RSSP, the functions of the sending and receiving sides are verified by using NSC.

In order to perform negotiation in the third embodiment, first the CSS command is transmitted from the terminal on the sending side to the terminal on the receiving side, then the latter responds by transmitting the RSSP command to the terminal on the sending side. Here verification of a non-standard terminal function is carried out. From this point onward, the CDCL, RDCLP, CDS and CDUI commands are transmitted between the terminals on the sending and receiving sides just as in the above-described embodiment.

The overall operation of the third embodiment will now be set forth.

Figure 6:
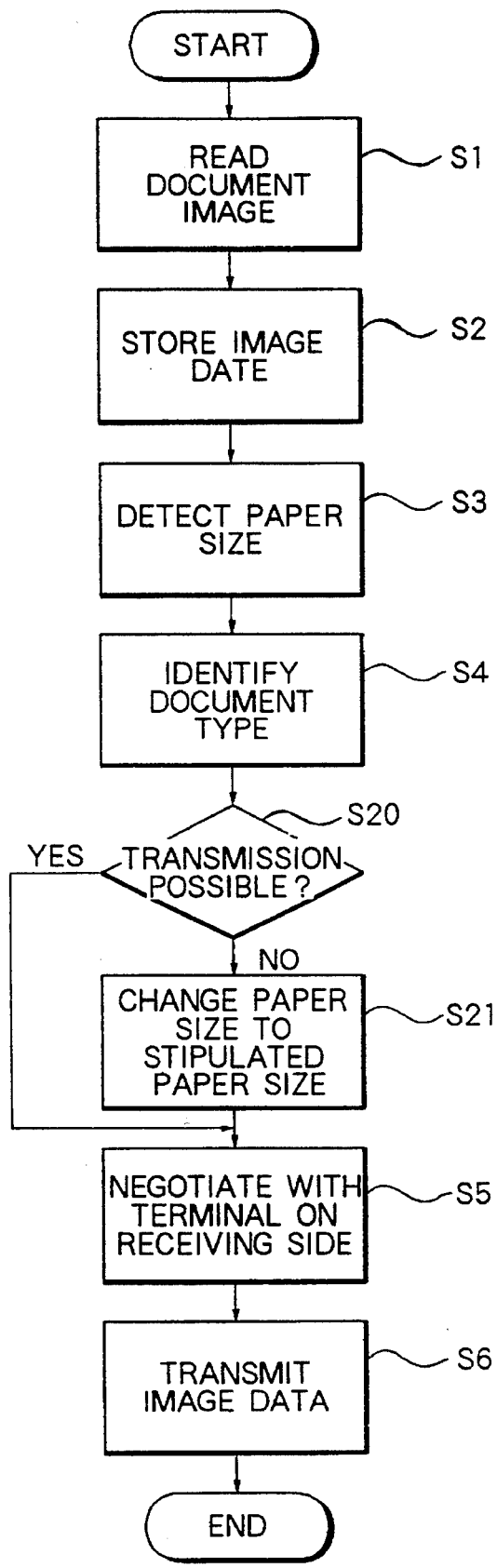
FIG. 6 is a flowchart for describing the operation of image transmission according to a third embodiment of the invention.

FIG. 6 is a flowchart for describing the image transmission operation according to the third embodiment. Processing from steps S1–S4 shown in FIG. 6 indicates operation similar to that of the first embodiment. In the third embodiment, negotiation using the CSS and RSSP is executed from this point onward based on the type of document, namely the paper size. In accordance with this processing, paper size at the time of transmission is selected from the usual stipulated sizes when the terminal at the destination of the transmission does not possess a function for receiving a legal-size or leisure-size document, which is not stipulated by the CCITT. Accordingly, a change is made to a stipulated size (steps S20, S21) even when the paper size of the document read on the sending side is legal or leisure size. When paper size at the time of transmission is thus decided, processing from this point onward is the same as in the first embodiment (namely steps S5 and S6).

Thus, in accordance with the third embodiment as described above, actions and effects similar to those of the first embodiment are obtained as a matter of course. Even if a paper size (e.g., legal size or leisure size) not stipulated by the CCITT is used, reliable operation is assured in conformity with the receiving function of the terminal at the destination of the transmission.

It also goes without saying that negotiation using a document number as an attribute may .be performed in the third embodiment just as in the second embodiment.

(FOURTH EMBODIMENT)

In the third embodiment set forth above, paper size is changed if the size in incapable of being transmitted. However, the invention is not limited to such an embodiment, for it is permissible to adopt an arrangement in which a transmittable paper size is added to the CSS and RSSP negotiation at the terminal on the receiving side. A fourth embodiment exemplifying such an arrangement will now be described.

The fourth embodiment of the invention has a construction and function similar to those of the third embodiment.

Figure 8:
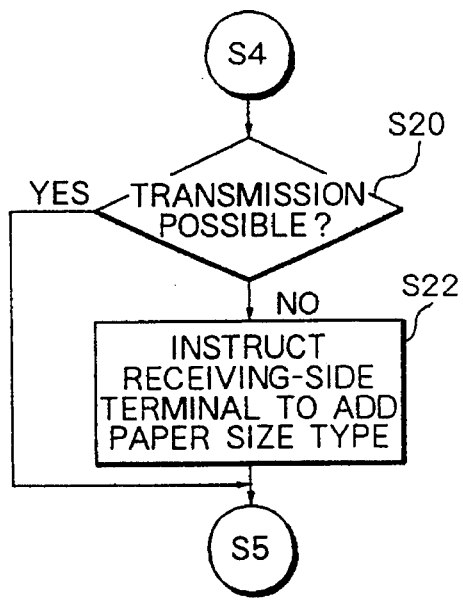
FIG. 8 is a flowchart for describing the principal part of an image transmitting operation according to a fourth embodiment of the present invention.

FIG. 8 is a flowchart for describing the essentials of the image transmission operation according to the fourth embodiment. The flow of the overall operation of image transmission is similar to that of the flowchart shown in FIG. 6 and therefore the entirety thereof need not be described again. The only difference is that whereas paper size is changed in the third embodiment when transmission is impossible (FIG. 6), in this embodiment an instruction is given so as to add a paper size transmitted by the sending side to the terminal on the receiving side when transmission is impossible (steps S20, S22). In the first embodiment, the document size table 100 is preserved in the ROM 5 (FIG. 1). In the fourth embodiment, however, the document size table 100 is saved in the RAM 5. The reason for this is to make it possible for the receiving side to add a document type anew in response to the instruction given by the sending side at step S22. In this way the terminal on the receiving side will add the paper size (main scanning direction X auxiliary scanning direction) transmitted from the sending side to the document size table 100 to make possible reception of the paper size requested by the sending side.

Thus, in accordance with the fourth embodiment set forth above, actions and effects similar to those of the third embodiment are obtained as a matter of course. In addition, it is also possible to realize image transmission at the paper size requested by the sending side.

It also goes without saying that negotiation using a document number as an attribute may be performed in the fourth embodiment just as in the second embodiment.

(FIFTH EMBODIMENT)

In the third and fourth embodiments, paper size at the time of transmission is decided on the sending side. However, the invention is not limited to such an arrangement, for it is also possible to effect any desired change on the receiving side as well. In this connection, an example of processing performed on the receiving side at the time of negotiation in the first embodiment will be described based on a fifth embodiment.

Figure 9:
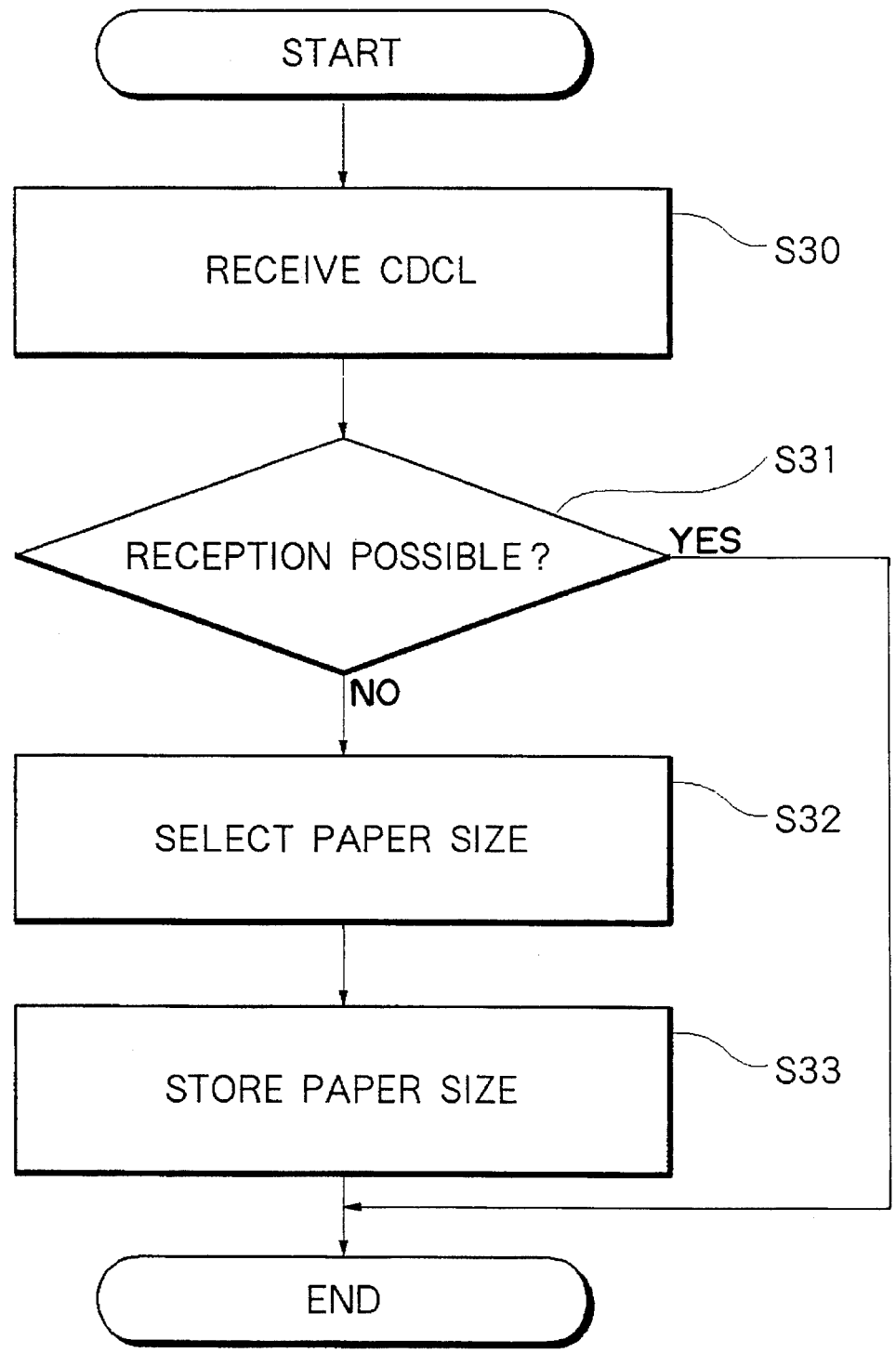
FIG. 9 is a flowchart for describing the operation of image reception according to a fifth embodiment of the present invention.

FIG. 9 is a flowchart for describing an image reception operation in accordance with the fifth embodiment.

When an ordinary line connection with the sending side is completed, CDCL is received from the terminal on the sending side (step S30). When paper size information is thus received, the terminal on the receiving side determines whether the paper size is capable of being received (step S31). If the determination is that the paper size can be received, processing similar to that of the first embodiment is executed. If it is determined that reception is impossible, the terminal on the receiving side selects a paper size approximating that of the transmitted paper size from its own reception function (step S32). The selected paper size is stored as the parameter of paper size at the time of image data reception (step S33). If there is no paper size that is selectable at step S32, it will suffice to communicate transmission at the ordinary rated size to the sending side during negotiation.

Thus, if a transmitted image can be received without difficulty, it will suffice to convert the paper size of the transmitted image data on the receiving side, so that excellent image transmission at a paper size other than that stipulated can be achieved, just as in the first embodiment.

It goes without saying that the fifth embodiment can of course be applied to negotiation of the second embodiment and also to negotiation (CSS, RSSP) of the third and fourth embodiments.

In the first through fifth embodiments set forth above, image data which has been read is used in order to sense the paper size of the transmitted image. However, this does not pose a limitation upon the invention, for it is possible to use sensing means such as an optical sensor. In such case, length of the document in the auxiliary (feed) scanning direction would be converted into BMU's and paper size would be judged based on the table shown in FIG. 2 or FIG. 5.

It should be noted that the present invention is not limited to the above-described embodiments but can be modified in various ways within the scope of the claims.

What is claimed is:

1. A communication processing apparatus comprising:

receiving means for receiving first information showing recording paper sizes from a terminal;

detecting means for detecting a paper size of a transmission document;

generating means for generating second information showing width and height of the transmission document in accordance with a detection result by said detecting means and the first information received by said receiving means; and transmitting means for transmitting the second information;

wherein the terminal is informed of the second information as a paper size of the transmission document.

2. The apparatus according to claim 1, wherein said detecting means detects a length of said transmission document in a main scanning direction and a length in an auxiliary scanning direction thereof, and said generating means generates information showing said lengths.

3. The apparatus according to claim 1, wherein said generating means changes said second information in accordance with said first information received by said receiving means.

4. The apparatus according to claim 1, wherein said generating means includes a table storing information of the paper size showing width and height.

5. The apparatus according to claim 4, wherein said table includes paper sizes other than paper sizes stipulated by the CCITT.

6. The apparatus according to claim 5, wherein the paper sizes other than those stipulated include legal size and leisure size.

7. The apparatus according to claim 1, wherein said information is expressed in basic measurement units.

8. The apparatus according to claim 1, wherein said transmitting means transmits said information based on a Group 4 communication control.

9. A communication processing method for informing a terminal of a size of a transmission document, comprising the steps of:

receiving first information showing a recording paper size from the terminal;

detecting a size of a transmission document;

generating second information showing lengths of width and height of the transmission document in accordance with a detection result by said detecting step and the first information received by said receiving step; and transmitting the second information generated by said generating step as size information of the transmission document.

10. A communication method for communicating image data, comprising the steps of:

detecting a width and a height of an image;

confirming availability of a non-standard function of a communication partner; and transmitting first data according to the width of the image and second data according to the height of the image to the communication partner if the communication partner has the non-standard function, wherein the first and second data are determined in accordance with a table in a memory and a paper type determined by the width and the height of the image detected in the detecting step, said table registering width direction length data and height direction length data corresponding to each of a plurality of paper types.

11. A communication method for communicating image data according to claim 10, wherein the image includes a transmission original.

12. A communication method for communicating image data according to claim 10, wherein the non-standard function of the communication partner is confirmed based on a communication with the communication partner in accordance with a G4 facsimile protocol.

13. A communication method for communicating image data according to claim 10, wherein the first and second data are transmitted in accordance with a G4 facsimile protocol.

14. A communication method for communicating image data according to claim 10, wherein the first and second data are expressed in basic measurement units.

15. A communication method for communicating image data according to claim 10, wherein the width and the height of the image stored in a memory are determined at the detecting step.

16. A communication method for communicating image data according to claim 10, wherein the image includes a reception image.

17. A communication method for communicating image data according to claim 10, wherein the image is read by an image reader.

18. A communication method according to claim 10, wherein the non-standard function is a function for receiving an image of non-standard paper size.

19. A communication apparatus comprising:

discriminating means for discriminating size of a plurality of paper types; and negotiating means for negotiating a paper size to be used for output based on the discriminated size, wherein said discriminating means includes memory means for storing width direction length data and height direction length data corresponding to each of the plurality of paper types, the plurality of paper types including legal paper and leisure paper, and said negotiating means negotiates using the width direction length data and the height direction length data stored in said memory means.

20. A communication apparatus according to claim 19, wherein the width direction length data and the height direction length data are expressed in bit management units.

21. A communication apparatus according to claim 19, wherein said negotiating means negotiates based on a Group 4 communication protocol.

22. A communication apparatus according to claim 19, wherein said discriminating means includes reading means for reading image data and second memory means for storing the image data read by said reading means, and said discriminating means discriminates a size represented by the image data stored in said second memory means.

23. A communication apparatus according to claim 19, wherein said negotiating means includes transmitting means for transmitting image data of the negotiated size.

24. A communication apparatus comprising:

discriminating means for discriminating respective sizes of a plurality of paper types, and negotiating means for negotiating, with a communication partner apparatus, a paper size to be used for output based on the discriminated sizes, wherein said discriminating means includes memory means for storing width direction length data and height direction length data corresponding to each of the plurality of paper types, and said negotiating means negotiates using the width direction length data and the height direction length data stored in said memory means.

25. A communication apparatus according to claim 24, wherein the width direction length data and the height direction length data are expressed in bit management units.

26. A communication apparatus according to claim 24, wherein said negotiating means negotiates based on a Group 4 communication protocol.

27. A communication apparatus according to claim 24, wherein said discriminating means includes reading means for reading image data and second memory means for storing the image data read by said reading means, and said discriminating means discriminates a size of the image data stored in said second memory means.

28. A communication apparatus according to claim 24, wherein said negotiating means includes transmitting means for transmitting image data of the negotiated size.

* * * * *

UNITED STATES PATENT AND TRADEMARK OFFICE
CERTIFICATE OF CORRECTION

PATENT NO. : 5,485,282                            Page 1 of 2

DATED       : January 16, 1996

INVENTOR(S): TAKASHI TAKEDA

It is certified that error appears in the above-identified patent and that said Letters Patent is hereby corrected as shown below:

Title page, item [56] References Cited

Line FPD OP, Insert:   --FOREIGN PATENT DOCUMENTS
                A0081362 12/1982 European Patent Office
                A0263319  9/1987 European Patent Office OTHER PUBLICATIONS
             IBM Technical Disclosure Bulletin, Vol. 25,
             No. 6, November 1982 (Cialone et al.)--.

COLUMN 1

Line 41, "other" should read --other than--.

COLUMN 3

Line 63, "13200 BMU" should read --20400 BMU--.

COLUMN 8

Line 26, "tion;" should read --tion,--.

UNITED STATES PATENT AND TRADEMARK OFFICE
CERTIFICATE OF CORRECTION

PATENT NO. : 5,485,282

DATED : January 16, 1996

INVENTOR(S) : TAKASHI TAKEDA

It is certified that error appears in the above-indentified patent and that said Letters Patent is hereby corrected as shown below:

COLUMN 10

Line 22, "types," should read —types;—.

Signed and Sealed this

Second Day of July, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,485,282

DATED : January 16, 1996

INVENTOR : Takashi Takeda

It is certified that error appears in the above-identified patent and that said Letters Patent is hereby corrected as shown below:

On title page, item [73],

Assignee: "Canon Kabuishiki Kaisha," should read
--Canon Kabushiki Kaisha,--

Signed and Sealed this

Eighth Day of October, 1996

Attest:

BRUCE LEHMAN

Attesting Officer

Commissioner of Patents and Trademarks